UNITED STATES PATENT OFFICE.

ALBERT HEMPEL, OF LEIPZIG-OETZSCH, GERMANY.

PROCESS OF PRODUCING FORMATES.

1,017,261.  Specification of Letters Patent.  Patented Feb. 13, 1912.

No Drawing.   Application filed September 7, 1910.   Serial No. 580,913.

*To all whom it may concern:*

Be it known that I, ALBERT HEMPEL, analytical chemist, and a subject of the King of Saxony, in the German Empire, residing at 53 Hauptstrasse, Leipzig-Oetzsch, in the Kingdom of Saxony, Germany, have invented new and useful Improvements in Processes of Producing Formates, of which the following is a specification.

This invention relates to an improved process of producing formates.

According to the process heretofore employed for producing formates, carbon monoxid is made to act under pressure on solutions of caustic potash at a temperature from 150 to 200° C. The temperature of the process was not permitted to exceed the temperature of 200° C. and the process had to take place slowly and under refrigeration. In carrying out this process the formate was liable to become agglomerated into lumps, which surround the caustic potash and withdraw it temporarily or even permanently from the action of the carbon monoxid. Consequently, the formate obtained according to the prior process, contained usually a considerable percentage of free caustic potash which goes to waste in transforming the formate into formic acid; besides it required sulfuric acid for its neutralization and increased considerably the temperature of reaction, thus decomposing the formic acid.

The object of my improved process is to dispense with these inconveniences by adding the caustic potash gradually in small quantities to the carbon monoxid which is present under high pressure and always in excess at a high temperature, either above or below 200° C. By this improved process the following advantages are obtained:

1st, the caustic potash, being introduced in small quantities meets the carbon monoxid in great excess so as to be readily transformed into formate, the more quickly, the higher the pressure of the same.

2nd, as the caustic soda or potash, respectively is immediately transformed into formate, no parts of the same can be withdrawn from the reaction by being enveloped by formates and thus go to waste. In consequence thereof, a more valuable formate, free from caustic potash, is obtained at a nearly quantitative output and highest percentage.

3rd, as in the new process at no time large quantities of free caustic soda are present, the formate formed by the reaction is in no way liable of being decomposed by the caustic soda. It is thereby not necessary to work so carefully and slowly nor to cool down so intensely. In place of caustic potash, the caustic or carbonic alkaliferous salts as well as the caustic or carbonic alkaline earths may be used in the same manner, both in solid or powdered, dry or damp condition.

I claim:

1. The process herein described of producing formates, which consists in adding caustic alkalis gradually in small quantities to carbon monoxid at a high temperature, high pressure and present in excess.

2. The process herein described of producing formates, which consists in adding caustic alkalis gradually in small quantities to carbon monoxid at a temperature of about 200° C. high pressure and present in excess.

In testimony whereof I affix hereunto my signature in the presence of two witnesses.

ALBERT HEMPEL.

Witnesses:
 RUDOLPH FRICKE,
 HEINRICH LOGES.